United States Patent Office 3,702,837
Patented Nov. 14, 1972

---

3,702,837
HYDROXYPHENYLALKYLENEYL ISOCYAN-URATE SYNERGIST COMBINATIONS
Jack C. Gilles, Shaker Heights, Ohio, assignor to The B. F. Goodrich Company, New York, N.Y.
No Drawing. Continuation-in-part of application Ser. No. 1,927, Dec. 29, 1969, which is a division of application Ser. No. 770,863, Oct. 25, 1968. This application Dec. 1, 1970, Ser. No. 94,219
The portion of the term of the patent subsequent to Jan. 1, 1989, has been disclaimed
Int. Cl. C08f 45/60; C10m 1/32; C11b 5/00
U.S. Cl. 260—45.8 N    4 Claims

ABSTRACT OF THE DISCLOSURE

Novel hydroxyphenylalkyleneyl isocyanurate synergist combinations have been prepared. These synergist compositions effectively stabilize α-monoolefin homopolymers and copolymers against the deleterious effects of oxygen, heat and light.

CROSS REFERENCE TO RELATED APPLICATION

This is a continuation-in-part of application Serial No. 1,927 filed Dec. 29, 1969 now U.S. Pat. 3,637,582, which, is a division of application Ser. No. 770,863 filed Oct. 25, 1968 now U.S. Pat. 3,531,483.

BACKGROUND OF THE INVENTION

Esters of cyanuric acid and isocyanuric acid, wherein the ester substituent is an aliphatic hydrocarbon radical containing up to about 8 carbon atoms, are known. Tris-(2-hydroxyalkyl)isocyanurates have also been prepared, however, the process employed for their preparation, the reaction of isocyanuric acid and an alkylene oxide, is not suitable for providing hydroxyaryl (phenolic) isocyanurates. Aryl isocyanurates have heretofore been limited to the functionally unsubstituted benzyl isocyanurates.

SUMMARY OF THE INVENTION

I have now prepared aryl isocyanurates wherein the aryl substituent is functionally substituted with a hydroxyl group. More particularly, the present invention relates to novel synergistic combinations of phenolic esters of isocyanuric acid such as 4-hydroxybenzyl isocyanurates with one or more other hindered phenol. The isocyanurate ring may be substituted with one, two or three hydroxyphenyl-alkyleneyl groups. The hydroxyphenylalkyleneyl radicals are alkyl substiuted, that is, they contain one or more alkyl radicals on the aromatic nucleus. It is essential for the compounds of the present invention that the position immediately adjacent to the hydroxyl group be substituted with an alkyl group. Preferred compounds of the present invention will have the hydroxyl group hindered with a tertiary alkyl group.

The present synergist compositions are useful to stabilize a wide variety of organic materials. They possess low volatility, are nonstaining and are extremely effective protective agents for organic polymeric materials, both natural and synthetic, which are subject to the deleterious effects of oxygen, heat and visible or ultraviolet light. They are especially useful as stabilizers for α-monoolefin homopolymers and copolymers, particularly, polyethylene, polypropylene, ethylene-propylene copolymer and ethylene-propylene terpolymers.

DETAILED DESCRIPTION

The phenolic esters of isocyanuric acid employed for the present invention are represented by the general formula

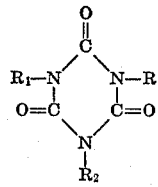

wherein R is a hydroxyphenylalkyleneyl radical having the formula

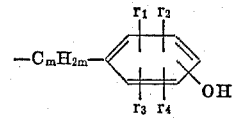

wherein $m$ is an integer from 1 to 4, $r_1$ is an alkyl group, either aliphatic or cycloaliphatic, containing from 1 to 18 carbon atoms and positioned immediately adjacent to the hydroxyl group on the ring, and $r_2$, $r_3$ and $r_4$ are hydrogen or an aliphatic or cycloaliphatic group containing from 1 to 18 carbon atoms; and $R_1$ and $R_2$ are hydrogen or the same as R above. Especially useful isocyanuric acid esters are those compounds wherein two, and more preferably all, of the R groups are hydroxyphenylalkyleneyl radicals wherein $r_1$ is a t-alkyl group containing from 4 to 12 carbon atoms, $r_2$ is an alkyl group containing from 1 to 12 carbon atoms, $r_3$ and $r_4$ are hydrogen and $m$ is 1, such as the 3,5-di-t-butyl-4-hydroxybenzyl radical, 3-methyl-5-t-butyl - 4-hydroxybenzyl radical, 2-methyl-5-t-butyl-4-hydroxybenzyl radical, 3-t-butyl-5-methyl-2-hydroxybenzyl radical or like radicals.

Also encompassed are the symmetrical tris-(3,5-di-t-alkyl - 4 - hydroxybenzyl)isocyanurates which are a preferred class of compounds and which may be represented structurally by the formula

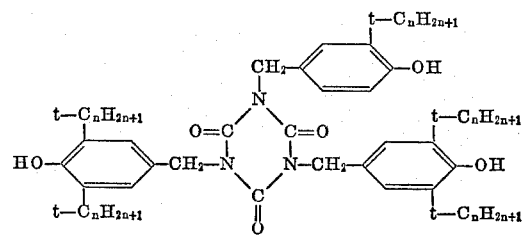

where $n$ is an integer from 4 to 8. With these compounds excellent synergistic stabilizer activity for organic materials which are subject to oxidative, thermal and ultraviolet degradation, such as for example, natural rubber and olefin homopolymers and copolymers is obtained. They possess a good balance of properties useful for many stabilizing applications. It is most significant with these tris-(3,5-di-t-alkyl-4-hydroxybenzyl)isocyanurates that although they are high molecular weight, a necessary requirement if low volatility is to be achieved, the concentration of the hindered phenol grouping has nevertheless been maintained at a high level (3 hindered phenol groups/molecule). This permits lower levels of stabilizer to be employed which results in a considerable economic advantage for the user.

Typical of the 4-hydroxybenzyl isocyanurates within the scope of the present invention are:

tris-(3-methyl-4-hydroxybenzyl)isocyanurate,
tris-(3-t-butyl-4-hydroxybenzyl)isocyanurate,
tris-(3-t-amyl-4-hydroxybenzyl)isocyanurate,
tris-(3-octyl-4-hydroxybenzyl)isocyanurate,
tris-(3,5-dimethyl-4-hydroxybenzyl)isocyanurate,
tris-(3,5-diisopropyl-4-hydroxybenzyl)isocyanurate,
tris-(3-methyl-5-isobornyl-4-hydroxybenzyl)isocyanurate,
tris-(3-cyclohexyl-4-hydroxybenzyl)isocyanurate,
tris-(3,5-di-t-butyl-4-hydroxybenzyl)isocyanurate,
tris-(3-t-butyl-5-t-amyl-4-hydroxybenzyl)isocyanurate,
tris-(3,5-di-t-amyl-4-hydroxybenzyl)isocyanurate,
tris-[3,5-di-(1-methyl-1-ethylpropyl)-4-hydroxybenzyl] isocyanurate,
tris-[3,5-di-(1,1,2,2-tetramethylpropyl)-4-hydroxybenzyl] isocyanurate,
tris-[3,5-di-(1,1-dimethylpentyl)-4-hydroxybenzyl]isocyanurate,
bis-(3-methyl-4-hydroxybenzyl)isocyanurate,
bis-(3-t-butyl-4-hydroxybenzyl)isocyanurate,
bis-(3,5-dimethyl-4-hydroxybenzyl)isocyanurate,
bis-(3,5-di-t-butyl-4-hydroxybenzyl)isocyanurate,
3-methyl-4-hydroxybenzyl isocyanurate,
3-t-butyl-4-hydroxybenzyl isocyanurate,
3,5-dimethyl-4-hydroxybenzyl isocyanurate,
3,5-di-t-butyl-4-hydroxybenzyl isocyanurate and the like. It is not necessary that the ester substituents on the isocyanuric acid be identical, however, from the standpoint of preparation it is generally easier to obtain compounds wherein all the substituents are the same.

To obtain the 4-hydroxybenzyl isocyanurates useful for this invention an alkali metal cyanate is reacted with a t-alkyl hindered p-hydroxybenzyl halide in an aprotic solvent, such as dimethyl sulfoxide or N,N-dimethylformamide, and at a temperature of about 100 to 130° C. It is essential that the alkali metal cyanate and the 4-hydroxybenzyl halide be employed in equimolar amounts if the tris-(4-hydroxybenzyl)isocyanurate is to be obtained. The mono- and di-substituted isocyanurates can be obtained when excess alkali metal cyanate is employed for the reaction. Other preparative techniques may also be employed to obtain these compounds, such as for example, the process described in U.S. Pat. 3,075,979.

The 4-hydroxybenzyl isocyanurates are high melting (above 200° C.) crystalline solids soluble in acetone, diethyl ether, dioxane, tetrahydrofuran, carbon tetrachloride, chloroform, aromatic hydrocarbons such as benzene, and toluene and slightly soluble in aliphatic hydrocarbons and alcohols such as hexane, methanol and ethanol. They are insoluble in water. The compounds will range in color from white to a very pale yellow when pure, however, if solvent or other impurities are present there can be appreciable color development upon exposure to air.

Organic materials which are stabilized in accordance with the present invention include both natural and synthetic polymers such as: cellulosic materials; natural rubber; halogenated rubber; homopolymers of ethylene, propylene, butene-1, isobutylene, pentene-1, hexene-1, 4-methyl-1-pentene and the like or copolymers thereof such as ethylene-propylene copolymer, ethylene-butene-1 copolymer, 4-methyl-1-pentene-hexene-1 copolymer and the like; ethylene-propylene-diene rubbers wherein the diene is 1,4-hexadiene, 2 - methyl - 1,4 - hexadiene, a dimethyl-1,4,9-decatriene, dicyclopentadiene, vinyl cyclohexene, vinyl norbornene, ethylidene norbornene, methylene norbornene, norbornadiene, methyl norbornadiene, methyl tetrahydroindene, and the like; conjugated diene polymers as for instance polybutadiene, copolymers of butadiene with styrene, acrylonitrile, acrylic acid, alkyl acrylates or methacrylates, methyl vinyl ketone, vinyl pyridine, etc., polyisoprene, polychloroprene and the like; vinyl polymers such as polyvinyl chloride, polyvinyl fluoride, polyvinylidene chloride, copolymers of vinyl chloride wtih vinylidene chloride, polyvinyl acetate, copolymers of vinyl halide with butadiene, styrene, vinyl esters, $\alpha,\beta$-unsaturated acids and esters thereof, $\alpha,\beta$-unsaturated ketones and aldehydes, and the like; homopolymers and copolymers of acrylic monomers such as acrylic acid, methacrylic acid, methyl acrylate, methyl methacrylate, ethyl acrylate, 2-ethylhexyl acrylate, acrylamide, methacrylamide, N-methylolacrylamide, acrylonitrile, methacrylonitrile and the like; polyether- or polyol- derived polyurethanes; acetal homopolymers and copolymers; polycarbonates; polyesters such as those derived from maleic, fumaric, itaconic or terephthalic anhydrides or the like, for example, polyethylene terephthalate; polyamides such as those derived from the reaction of hexamethylenediamine with adipic or sebacic acid; epoxy resins such as those obtained from the condensation of epichlorohydrin with bisphenols; and the like.

In addition to polymeric materials, the present compositions stabilize a wide variety of other organic materials. Such compounds include: waxes; synthetic and petroleum derived lubricating oils and greases; animal oils such as, for example, fat, tallow, lard, cod-liver oil, sperm oil; vegetable oils such as castor, linseed, peanut, palm, cotton seed and the like; fuel oil; diesel oil; gasoline; and the like.

The 4-hydroxybenzyl isocyanurate/phenol synergist compositions of this invention are especially useful for the stabilization of $\alpha$-monoolefin homopolymers and copolymers. High- and low-density polyethylene, polypropylene, polyisobutylene, poly(4-methyl-1-pentene) have excellent resistance to oxidative attack when stabilized with the compounds of the present invention. Ethylene-propylene copolymers and ethylene-propylene terpolymers generally containing less than about 10% by weight of one or more monomers containing multiple unsaturation also possess excellent stability when stabilized with 4-hydroxybenzyl isocyanurate synergists. Polymer blends, that is, physical admixture of two or more polymers may also be stabilized in accordance with the present invention. Excellent synergistic activity is observed wtih the $\alpha$-monoolefin homopolymers and copolymers.

The amount of 4-hydroxybenzyl isocyanurate employed will vary with the particular material to be stabilized and also the particular 4-hydroxybenzyl isocyanurate employed. Certain 4-hydroxybenzyl isocyanurates are more useful for certain applications than others. This feature is attributable to the compatibility of the isocyanurate with the organic material to be stabilized due to the difference in alkyl substitution on the phenol ring or the number of phenol groups substituted on the isocyanurate ring, that is, whether the isocyanurate be mono- di- or tri-substituted. Generally, however, for the effective stabilization of organic materials the 4-hydroxybenzyl isocyanurate ranges between about 0.01% and about 5% by weight based on the weight of the organic material to be employed. With the poly($\alpha$-monoolefin) homopolymers and copolymers excellent synergistic activity is obtained when about 0.01% to about 1.5% by weight of the 4-hydroxybenzyl isocyanurate based on the weight of the olefin polymer is employed.

Employed with the 4-hydroxybenzyl isocyanurate to make up the very effective synergist compositions of this invention is a second hindered phenol. The mol ratio of the 4-hydroxybenzyl isocyanurate compound to said hindered phenol will range between about 1:1 to about 100:1 with excellent results being obtained within the range 2:1 to 10:1. Typical hindered phenols which may be combined with the 4-hydroxybenzyl isocyanurate to obtain synergistic activity include: 2,6-di-t-butyl-4-methylphenol; 4,4'-thiobis(t-butyl - m - cresol); 2,2'-methylenebis-(6-t-butyl-4-methylphenol); hexahydro - 1,3,5 - tris - (4-hydroxyaryl)-s-triazines such as hexahydro-1,3,5-tris-$\beta$-(3,5-di -t - butyl - 4 - hydroxyphenyl)propionyl-s-triazine and hexahydro - 1,3,5 - tris - $\beta$ - (3,5-di-t-butyl-4-hydroxyphenyl) - α - methylpropionyl - s - triazine; alkylhydroxyphenyl-carboalkoxy-substituted nitrogen heterocycles such as 2,2',2" - tris[3(3,5 - di - t - butyl-4-hydroxyphenyl)-propionyloxy]ethyl isocyanurate; 1,1,3-tris′2-methyl-5-t-butyl - 4 - hydroxyphenyl)butane; tetra[methylene-3-(3,5-di - t - butyl - 4 - hydroxyphenyl)propionate]methane; 1,3,5 - trimethyl - 2,4,6 - tris(3,5-di-t-butyl-4-hydroxybenzyl)benzene; octadecyl - 3 - (3,5 - di - t - butyl-4-hydroxyphenyl)propionate; and like hindered phenols. Other hindered phenols such as tris-(3,5-di-t-butyl-4-hydroxyphenyl)phosphate may also be employed. Excellent synergistic activity for α-monoolefin homopolymers and copolymers is obtained when tris(3,5-di-t-butyl-4-hydroxybenzyl)isocyanurate is combined with tetra[methylene-3-(3,5-di-t-butyl - 4 - hydroxyphenyl)propionate]methane, 1,1,3-tris(2 - methyl - 5 - t - butyl-4-hydroxyphenyl)butane or octadecyl - 3 - (3,5-di-t-butyl-4-hydroxyphenyl)propionate at a mol ratio from 2:1 to 10:1. The present compositions find utility in that they are extremely effective protective agents against the deleterious effects of oxygen, heat and light for a wide variety or organic materials.

The synergist compositions of the present invention are readily incorporated into the organic materials to be stabilized and generally require no special processing techniques. Conventional methods of the incorporation have been found adequate. For example, they are readily incorporated into the polymers by mixing on a rubber mill or on a Banbury mixer; or they may be added alone, in a suitable solvent, or masterbatched with other ingredients to a solution or dispersion of the polymer. The ready solubility of the compounds of this invention in a wide variety of organic solvents facilitates their use in solution and also renders them compatible with most oils and lubricants. They are compatible with conventional compounding ingredients such as, for example, processing oils, plasticizers, lubricants, antisticking agents, fillers, reinforcing agents, sulfur and other curing agents, accelerators, antifoaming agents, rust inhibitors, pourpoint depressants and the like. They are compatible with other known antioxidants, antiozonants, color stabilizers, heat stabilizers, ultra-violet absorbers and the like.

The following examples serve to illustrate the invention more fully. All parts and percentages, unless otherwise indicated are given on a weight basis.

EXAMPLE I

A glass reactor equipped with a stirrer, condenser and dropping funnel was charged with 200 ml. of anhydrous N,N-dimethylformamide and 16.2 grams (0.2 mol) anhydrous potassium cyanate suspended therein. The reactor and dropping funnel were maintained under a nitrogen blanket throughout the run. The suspension was heated to 130° C. and 51 grams (0.2 mol) 3,5-di-t-butyl-4-hydroxybenzyl chloride dissolved in 50 ml. dry N,N-dimethylformamide added dropwise over a two hour period. The reaction mixture was heated with stirring for an additional hour, allowed to cool and poured into ice water. The crude reaction product was recovered by filtration. Purification of the tris-(3,5-di-t-btuyl-4-hydroxybenzyl)-isocyanurate was achieved by multiple extraction of an ether solution of the crude product with 5% aqueous sodium hydrosulfite, water and saturated salt solution. The ether was removed by evaporation and the product recrystallized from methanol and water. 25 grams of the tris-(3,5-di-t-butyl-4-hydroxylbenzyl)isocyanurate melting at 213–215° C. was obtained. Infrared analysis showed a single carbonyl peak at 1710 cm.$^{-1}$ and no nitrogen-hydrogen linkages. Elemental analysis of the product agreed with values calculated for tris-(3,5-di-t-butyl-4-hydroxybenzyl)isocyanurate.

EXAMPLE II

To demonstrate the effectiveness of tfhe 4-hydroxybenzyl isocyanurate compounds employed in combination with other known hindered phenol stabilizers, tris-(3,5-di-t-butyl-4-hydroxybenzyl)isocyanurate and 1,1,3-tris-(2-methyl-5-t-butyl-4-hydroxyphenyl)butane were added to polypropylene. The additives were incorporated by dissolving them in acetone, suspending the polymer in the solvent and then removing the acetone with a rotary evaporator. The test samples were prepared by molding the stabilized polypropylene at 4500° F. and 4000 p.s.i. 25 mil samples were heated for 2 minutes before transferring to a cold press maintained at 4000 p.s.i. for a 2 minute cooling period. Twenty-five mil samples were aged in an air-circulating oven at 140° C. The samples were deemed to have failed at the first sign of crazing. The test results obtained for these stabilizer compositions as well as results obtained for the individual stabilizer components were as follows:

| Sample | 1 | 2 | 3 |
|---|---|---|---|
| Stabilizer (parts per hundred polymer): | | | |
| Tris-(3,5-di-t-butyl-4-hydroxybenzyl)isocyanurate | 0.25 | | 0.2 |
| 1,1,3-tris-(2-methyl-5-t-butyl-4-hydroxyphenyl)butane | | 0.1 | 0.05 |
| Hours to crazing | 250 | 95 | 850 |

It is evident from the data that synergism is obtained. Similar synergistic activity was obtained when the hydroxyphenylalkyleneyl isocyanurates were combined with other phenolic stabilizers which are well known to the art such as 2,6-di-t-butyl-4-methylphenol, tetra[methylene - 3 - (3,5 - di-t-butyl-4-hydroxyphenyl)propionate] methane, 1,3,5 - trimethyl-2,4,6-tris-(3,5-di-t-butyl-4-hydroxybenzyl)benzene, octadecyl - 3-(3,5-di-t-butyl-4-hydroxyphenyl)propionate and tris-(3,5-di-t-butyl-4-hydroxyphenyl)phosphate, 4,4′-thiobis-(3-methyl-6-t-butylphenol).

EXAMPLE III

Following the procedures described in Example II, polypropylene was stabilized in accordance with the present invention and tested. Details and results were as follows:

| Sample | 4 | 5 | 6 | 7 | 8 |
|---|---|---|---|---|---|
| Stabilizer (parts): | | | | | |
| Tris-(3,5-di-t-butyl-4-hydroxybenzyl)isocyanurate | 0.2 | | | 0.2 | 0.2 |
| Octadecyl-3-(3,5-di-t-butyl-4-hydroxyphenyl)propionate | | 0.1 | | 0.05 | |
| Tetra[methylene-3-(3,5-di-t-butyl-4-hydroxyphenyl)propionate]methane | | | 0.05 | | 0.05 |
| Hours to crazing | 200 | 200 | 516 | 532 | 2,180 |

I claim:
1. A stabilized composition of matter comprising (a) an α-monoolefin homopolymer or copolymer; (b) about 0.01% to about 5% by weight hydroxyphenylalkyleneyl isocyanurate of the formula

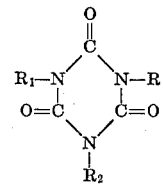

wherein R is a hydroxyphenylalkyleneyl radical having the formula

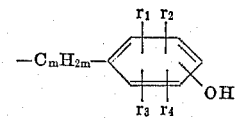

wherein $m$ is an integer from 1 to 4, $r_1$ is an alkyl group positioned immediately adjacent to the hydroxyl group on the ring and contains from 1 to 18 carbon atoms and $r_2$, $r_3$ and $r_4$ are selected from the group consisting of hydrogen or an alkyl group containing from 1 to 18 carbon atoms; and $R_1$ and $R_2$ are selected from the group consisting of hydrogen or R; and (c) hindered phenol antioxidants selected from the group consisting of 2,6-di-t-butyl - 4 - methylphenol; 4,4' - thiobis(t-butyl-m-cresol); 2,2' - methylenebis - (6 - t - butyl - 4 - methylphenol); hexahydro - 1,3,5 - tris - (4 - hydroxyaryl) - s - triazines such as hexahydro - 1,3,5 - tris - β - (3,5 - di - t - butyl-4-hydroxyphenyl)propionyl - s - triazine and hexahydro-1,3,5 - tris - β - (3,5-di-t-butyl-4-hydroxyphenyl)-α-methyl-propionyl-s-triazine; alkylhydroxyphenyl - carboalkoxy-substituted nitrogen heterocycles such as 2,2',2''-tris[3(3, 5-di-t-butyl - 4 - hydroxyphenyl)propionyloxy]ethyl isocyanurate; 1,1,3 - tris(2 - methyl - 5 - t - butyl - 4 - hydroxyphenyl)butane; tetra[methylene - 3 - (3,5 - di - t-butyl - 4 - hydroxyphenyl)propionate]methane; 1,3,5-trimethyl - 2,4,6 - tris(3,5 - di - t - butyl - 4 - hydroxybenzyl) benzene; octadecyl - 3 - (3,5 - di - t - butyl - 4 - hydroxyphenyl)propionate; and tris - (3,5 - di-t-butyl-4-hydroxyphenyl)phosphate; the mol ratio of said hydroxyphenylalkyleneyl isocyanurate to said phenolic antioxidant ranging between about 1:1 to 100:1.

2. A stabilized composition of matter of claim 1 wherein $r_1$ of the hydroxyphenylalkyleneyl radical is a tertiary alkyl group containing from 4 to 12 carbon atoms, $r_2$ is an alkyl group containing from 1 to 12 carbon atoms, $r_3$ and $r_4$ are hydrogen and $m$ is 1.

3. A stabilized composition of matter of claim 2 wherein the α-monoolefin polymer is polyethylene or polypropylene.

4. A stabilized composition of matter of claim 3 wherein the phenolic antioxidant (c) is selected from the group consisting of tetra[methylene-3-(3,5-di-t-butyl-4-hydroxyphenol)propionate]methane, 1,1,3-tris(2-methyl - 5 - t-butyl-4-hydroxyphenyl)butane and octadecyl-3(3,5-di-t-butyl - 4 - hydroxyphenyl)propionate, the hydroxyphenylalkyleneyl isocyanurate is tris(3,5-di - t - butyl-4-hydroxybenzyl)isocyanurate and the mol ratio of the tris(3,5-di-t-butyl-4-hydroxybenzyl)isocyanurate to the phenolic antioxidant is between about 2:1 and 10:1.

References Cited
UNITED STATES PATENTS

| | | | |
|---|---|---|---|
| 3,531,483 | 9/1970 | Gilles | 260—248 |
| 3,472,805 | 10/1969 | Marinaccio et al. | 260—23 |
| 3,502,613 | 3/1970 | Berger | 260—45.8 |
| 3,239,484 | 3/1966 | Stark | 260—45.9 |

DONALD E. CZAJA, Primary Examiner

R. A. WHITE, Assistant Examiner

U.S. Cl. X.R.

44—63; 252—51.5 R; 260—45.85 S, 45.95, 398.5

UNITED STATES PATENT OFFICE
CERTIFICATE OF CORRECTION

Patent No. 3,702,837     Dated November 14, 1972

Inventor(s) JACK C. GILLES

It is certified that error appears in the above-identified patent and that said Letters Patent are hereby corrected as shown below:

Column 2, lines 42 to 52, that portion of the formula reading

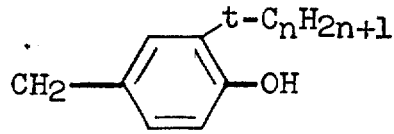   should read as follows:

-- 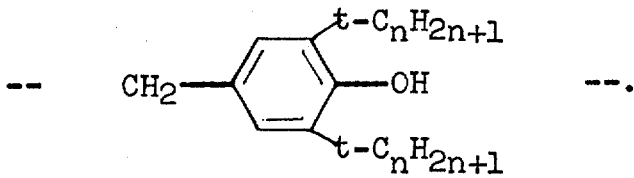 --.

Column 6, line 7, "4500°F." should read --400°F.--.

Signed and sealed this 9th day of April 1974.

(SEAL)
Attest:

EDWARD M. FLETCHER, JR.
Attesting Officer

C. MARSHALL DANN
Commissioner of Patents